United States Patent

(12) United States Patent (10) Patent No.: US 8,670,304 B1
Reynolds et al. (45) Date of Patent: *Mar. 11, 2014

(54) DYNAMIC MIRRORING OF A NETWORK CONNECTION

(75) Inventors: Keith R. Reynolds, Seattle, WA (US); John R. Hughes, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,268

(22) Filed: Sep. 4, 2012

Related U.S. Application Data

(63) Continuation of application No. 11/670,408, filed on Feb. 1, 2007, now Pat. No. 8,284,657, which is a continuation of application No. 10/729,720, filed on Dec. 5, 2003, now Pat. No. 7,197,661.

(51) Int. Cl.
*H04L 12/26* (2006.01)
(52) U.S. Cl.
USPC ............................................ 370/220; 370/217
(58) Field of Classification Search
USPC ......... 370/216, 217, 218, 219, 220, 229, 235, 370/236, 241, 242, 244, 252; 709/203, 224, 709/227, 238, 239; 714/100, 1, 2, 3, 4.1, 714/4.11, 4.12
See application file for complete search history.

(56) References Cited

U.S. PATENT DOCUMENTS

| | | | |
|---|---|---|---|
| 5,187,706 A | 2/1993 | Frankel et al. | |
| 5,881,226 A | 3/1999 | Veneklase | |
| 6,609,206 B1 | 8/2003 | Veneklase | |
| 6,640,240 B1 | 10/2003 | Hoffman et al. | |
| 6,971,027 B1 | 11/2005 | Veneklase | |
| 7,061,942 B2 * | 6/2006 | Noronha et al. | 370/537 |
| 7,073,090 B2 | 7/2006 | Yanai et al. | |
| 7,111,076 B2 | 9/2006 | Abjanic et al. | |
| 7,116,634 B1 | 10/2006 | Hanselmann | |
| 7,139,926 B1 | 11/2006 | Madhav et al. | |
| 7,184,394 B2 | 2/2007 | Rombeaut et al. | |
| 7,197,661 B1 | 3/2007 | Reynolds et al. | |
| 7,272,746 B2 | 9/2007 | Deerman et al. | |
| 7,337,467 B2 | 2/2008 | Veneklase | |

(Continued)

OTHER PUBLICATIONS

Rescorla, E. et al., "SSLACC: A Clustered SSL Accelerator," Proceedings of the 11th USENIX Security Symposium, San Francisco, CA, 2002, pp. 1-18.

(Continued)

*Primary Examiner* — Michael Thier
*Assistant Examiner* — Feben M Haile
(74) *Attorney, Agent, or Firm* — Frommer Lawrence & Haug LLP; Jamie L. Wiegand

(57) ABSTRACT

Methods and systems are directed to dynamically mirroring a connection between network devices. Mirroring is managed by forwarding a packet between a first network device and a second network device. In one method, the first network device receives the packet from a client and communicates the packet to the second network device. A forwarding device, pre-determined from the first and second network devices, forwards the packet to a server. The first network device receives a response from the server, and communicates it to the second network device. The forwarding device forwards the response packet to the client. In one configuration, the first network device and forwarding device is an active device, and the second network device is a standby device. In another configuration, the first network device is a standby device, and the second network device and forwarding device is an active device.

17 Claims, 8 Drawing Sheets

(56) References Cited

U.S. PATENT DOCUMENTS

| | | |
|---|---|---|
| 7,461,290 B1 | 12/2008 | Reynolds et al. |
| 7,535,826 B1 | 5/2009 | Cole et al. |
| 7,620,040 B2 | 11/2009 | Bhaskaran |
| 8,284,657 B1 | 10/2012 | Reynolds et al. |
| 2002/0169889 A1 | 11/2002 | Yang et al. |
| 2002/0176355 A1 | 11/2002 | Mimms et al. |
| 2003/0119475 A1 | 6/2003 | Choi |
| 2004/0003094 A1 | 1/2004 | See |
| 2005/0213498 A1 | 9/2005 | Appanna et al. |
| 2006/0136724 A1 | 6/2006 | Takeshima et al. |
| 2007/0038853 A1 | 2/2007 | Day et al. |
| 2007/0160198 A1 | 7/2007 | Orsini et al. |
| 2007/0203957 A1 | 8/2007 | Desai et al. |
| 2012/0159235 A1* | 6/2012 | Suganthi et al. ............ 714/4.11 |

OTHER PUBLICATIONS

U.S. Appl. No. 11/420,677, filed May 26, 2006 for Accessing SSL Connection Data by a Third-Party.

Official Communication for U.S. Appl. No. 12/240,940 mailed Nov. 22, 2011.

Official Communication for U.S. Appl. No. 12/240,940 mailed Mar. 18, 2011.

"Big-IP Reference Guide," Version 4.5, Chapter 13, "Configuring a Redundant System," 2002, pp. 13-1-13-20.

"Compress" "Decompress" "SSL" "Proxy" Microsoft Computer Dictionary (Fifth Edition), 2002, Microsoft Press, 6 pages.

Null et al., "The Essentials of Computer Organization and Architecture," Jones and Bartlett Computer Science, 2003, pp. 521-524, 538-548.

Official Communication for U.S. Appl. No. 11/670,408 mailed Jul. 10, 2008.

Official Communication for U.S. Appl. No. 11/670,408 mailed Feb. 3, 2009.

Official Communication for U.S. Appl. No. 11/670,408 mailed Oct. 7, 2009.

Official Communication for U.S. Appl. No. 11/670,408 mailed Dec. 16, 2009.

Official Communication for U.S. Appl. No. 11/670,408 mailed Feb. 25, 2010.

Official Communication for U.S. Appl. No. 11/670,408 mailed Aug. 4, 2010.

Official Communication for U.S. Appl. No. 11/670,408 mailed Oct. 20, 2010.

Official Communication for U.S. Appl. No. 11/670,408 mailed Jul. 7, 2011.

Official Communication for U.S. Appl. No. 11/670,408 mailed Feb. 24, 2012.

Official Communication for U.S. Appl. No. 11/670,408 mailed Jun. 1, 2012.

Official Communication for U.S. Appl. No. 10/729,720 mailed Jun. 16, 2006.

Official Communication for U.S. Appl. No. 10/729,720 mailed Nov. 28, 2006.

Official Communication for U.S. Appl. No. 11/670,405 mailed Dec. 28, 2007.

Official Communication for U.S. Appl. No. 11/670,405 malted Jul. 28, 2008.

* cited by examiner

DYNAMIC MIRRORING OF A NETWORK CONNECTION

CROSS-REFERENCE TO RELATED APPLICATION

This utility patent application is a continuation of U.S. patent application Ser. No. 11/670,408 filed on Feb. 1, 2007, which is a continuation of U.S. Pat. No. 7,197,661 filed on Dec. 5, 2003, and entitled "System and Method For Dynamic Mirroring Of A Network Connection," the benefits of which are claimed under 35 U.S.C. §120, and which are each incorporated herein by reference.

TECHNICAL INVENTION

The present invention relates to redundant network devices, and in particular, to mirroring of a connection between an active network device and a standby network device.

BACKGROUND

Today's high availability network devices, such as routers, load balancing systems, and the like, typically employ of pair of network devices; one network device, known as the 'active unit,' which processes network traffic, and a second 'standby unit,' which monitors the active unit, and takes over processing of the network traffic if the active unit fails. To enable the standby unit to continue processing of connections that were in progress at the time of the failure, certain information about each connection should be made available to the standby unit during processing. This process is known as 'connection mirroring.' For simple connections, this may be limited to sending connection information at a beginning and an end of the connection. However, for more complex, high-level protocols, such as Secure Sockets Layer (SSL), and the like, significant amounts of connection information may need to be sent continuously to the standby unit during a lifetime of the connection.

To ensure reliability during failover of the standby unit, the connection mirroring system typically verifies that the information that is sent to the standby unit is properly received. This may be performed by having the standby unit verify the integrity of the information it receives, and provide an acknowledgement of the information. However, such communications may slow processing of connections by the active unit, and increase the amount of network traffic that is sent between the active unit and the standby unit.

Moreover, while some network connections may benefit from mirroring, others may not. In some networked applications, whether the connection benefits from mirroring may depend on a complex interplay of attributes associated with the connection, a user, a server, and the data that is managed by the network device. For example, in a typical load balancing system, configuring the system so that mirroring only occurs for those connections that may benefit from it often requires a complicated configuration that needs to be updated frequently as an application being handled changes. Therefore, there is a need in the industry for improved methods and systems for managing the reliability of a connection mirroring of network devices. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
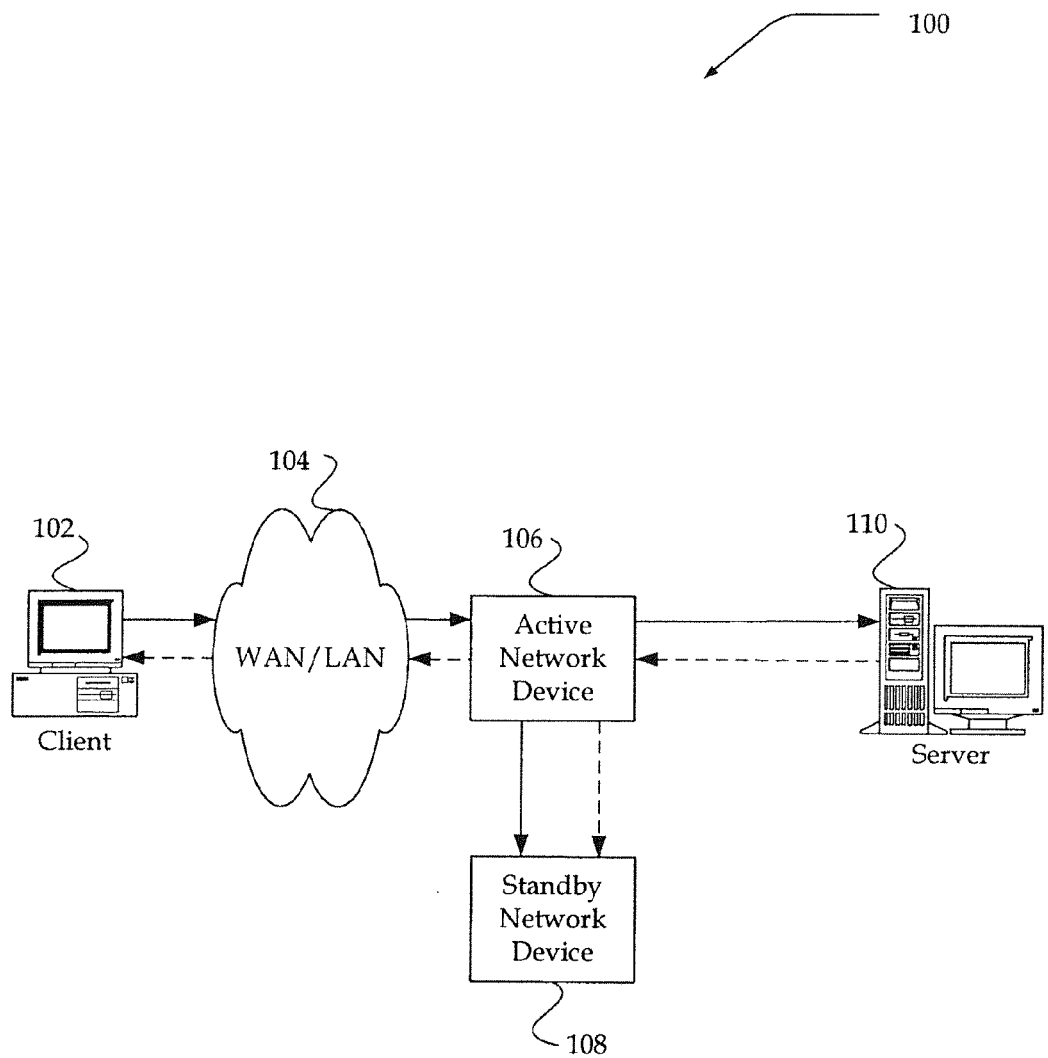
FIG. 1 illustrates one embodiment of an environment in which a system operates for managing reliability of a mirrored connection using a content mirroring configuration.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a, an," and "the" include plural references. The meaning of "in" includes "in" and "on."

The term "packet" includes an IP (Internet Protocol) packet. The term "flow" includes a flow of packets through a network. The term "connection" refers to a flow or flows of packets that typically share a common source and destination. The term "node" refers to a network element that typically interconnects one or more devices, or even networks.

Briefly stated, the present invention is directed to a system and method for dynamically mirroring a connection between network devices. Such mirrored connections may be between network devices that are configured to operate as load balancers, routers, proxies, bridges, network address translators, traffic management devices, and the like.

Connection mirroring is accomplished in part by communicating the entire contents of every packet, within a connection, between an active network device and a standby network device. This enables the standby network device to construct virtually an equivalent internal state associated with each connection, which may be employed in the event of a failure of the active network device.

Generally, a first network device receives a packet from a client and communicates the packet to a second network device. A forwarding device, pre-determined from the first and second network devices, forwards the packet to a server, and may provide an acknowledgement packet to the client. The first network device receives a response from the server, and communicates it to the second network device. The forwarding device communicates another acknowledgement packet to the server. The forwarding device also forwards the response packet to the client. In one embodiment of a content mirroring configuration, the first network device is an active network device, the second network device is a standby network device, and the forwarding device is the active network device. In one embodiment of a standby response configuration, the first network device is the active network device, the second network device is the standby network device, and the forwarding device is the standby network device. In one embodiment of a standby first configuration, the first network device is a standby network device, the second network device is the active network device, and the forwarding device is the active network device.

Illustrative Operating Environment

FIG. 1 illustrates one embodiment of an environment in which a system operates for managing reliability of a mirrored connection using a content mirroring configuration. Not all the components may be required to practice the invention, and variations in the arrangement and type of the components may be made without departing from the spirit or scope of the invention.

As shown in the figure, system 100 includes client 102, wide area network (WAN)/local area network (LAN) 104, active network device 106, standby network device 108, and server computer 110. WAN/LAN 104 is in communication with client 102 and active network device 106. Active network device 106 is in communication with standby network device 108 and with server computer 110. Solid lines between components in the figure represent a flow of packets, or a forward connection, from client 102 towards server 110. Dashed lines represent a flow of response packets, or response connection, from server 110 towards client 102. Together, the forward and response connection comprise a connection between client 102 and server 110.

Client 102 may be any device capable of sending and receiving a packet over a network, such as WAN/LAN 104, to and from server 110. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client 102 may be any device that is capable of connecting using a wired or wireless communication medium such as a PDA, POCKET PC, wearable computer, and any other device that is equipped to communicate over a wired and/or wireless communication medium.

WAN/LAN 104 couples client 102 to active network device 106. WAN/LAN 104 is enabled to employ any form of computer readable media for communicating information from one electronic device to another. In addition, WAN/LAN 104 can include the Internet in addition to local area networks (LANs), wide area networks (WANs), direct connections, such as through a universal serial bus (USB) port, other forms of computer-readable media, and any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, WAN/LAN 104 includes any communication method by which information may travel between client 102 and active network device 106. Although not shown, a network substantially similar to WAN/LAN 104 may couple active network 106 to server 110.

Server 110 may include any computing device capable of communicating packets with client 102. Each packet may convey a piece of information. A packet may be sent for handshaking, i.e., to establish a connection or to acknowledge receipt of data. The packet may include information such as a request, a response, a put command, a configuration command, or the like. For example, a packet may represent a write transaction, a read transaction, a request transaction, and the like, to a database, or other application hosted on server 110. The information may also be communicated employing any of a variety of compression/decompression techniques, including, but not limited to, file compression including ARC, ZIP, and the like, data compression including BMP, fractal image compression, TIFF, and the like. The information may also be encrypted employing any of a variety of security techniques, including, but not limited to those employed in Secure Sockets Layers (SSL), Layer 2 Tunneling Protocol (L2TP), Transport Layer Security (TLS), Tunneling TLS (TTLS), IPSec, Extensible Authentication Protocol, (EAP), and the like.

Generally, packets received by server 110 will be formatted according to TCP/IP, but they could also be formatted using another transport protocol, such as User Datagram Protocol (UDP), Internet Control Message Protocol (ICMP), NETbeui, IPX/SPX, token ring, and the like.

Moreover, server 110 is arranged such that at least a portion of content on server 110 may be replicated across another server (not shown). In such a configuration, active network device 106 and standby network device 108 may be configured to operate as load balancers, to enable determination of a server to respond to client requests.

Server 110 may be configured to operate as a website, a File System, a File Transfer Protocol (FTP) server, a Network News Transfer Protocol (NNTP) server, a database server, and the like.

Devices that may operate as server 110 include, but are not limited to, personal computers desktop computers, multiprocessor systems, microprocessor-based or programmable consumer electronics, network PCs, servers, and the like.

Active network device 106 includes virtually any device that manages network traffic between client 102 and server 110. Such devices include, for example, routers, proxies, firewalls, load balancers, devices that perform network address translations, devices that perform compression/decompression of packet contents, any combination of the preceding devices, and the like.

Active network device 106 may, for example, control a packet flow, between client 102 and server 110. Active network device 106 may operate as a load balancing device that is configured to determine a server other than server 110 for which to route packets from client 102. Active network device 106 may employ any of a variety of load-balancing mechanisms to determine the server to service client 102.

Active network device 106 may also perform operations on the packets as the packets flow through it. For example, active network device 106 may perform a network address translation (NAT) upon a header within a packet. That is, in a TCP/IP packet, active network device 106 may change the source and/or destination field within the packet header.

Active network device 106 may also insert information into, and/or remove information from, the flow of packets between client 102 and server 110. Active network device 106 may combine more than one packet to perforin a transformation that may span a packet boundary, or to make a load balancing, and the like, based on information that spans the packet boundary. If it combines more than one packet, active network device 106 may forward more or fewer packets than were originally combined after performing the transformation.

Active network device 106 may also perform a compression and/or decompression operation upon the packet, a packet payload, and the like. For example, active network device 106 may compress or decompress a packet received from client 102 prior to forwarding the packet to server 110. Similarly, active network device 106 may compress or decompress a response packet received from server 110, prior to forwarding the response packet to client 102. Active network device 106 may employ any of a variety of mechanisms to perform the compression/decompression operations upon the packet, packet payload, and the like. Active network device 106 may further combine multiple packets before compression and/or decompression, and forward more or fewer packets after compression and/or decompression.

Active network device 106 may generate additional information used to establish a network connection, or based on a variety of events during an existing network connection. This additional information may include, but is not limited to an initial sequence number, and the like. Active network device 106 may forward the additional information to standby network device 108.

Similarly, active network device 106 may be configured to establish and maintain a Secure Socket Layer (SSL) connection between client 102 and server 110. Active network device 106 may generate additional information used to establish the SSL connection, including, but not limited to, a server-random value, and the like. Active network device 106 may further perform any encryption/decryption operations employed by the SSL protocol upon the packets associated with the connection between client 102 and server 110. Because active network device 106 may generate such additional information employed in the SSL protocol, decompression/compression operations, and the like, it is designated as the 'active' network device.

Moreover, active network device 106 may perform virtually any transformation upon the packets that are sent between client 102 and server 110, including, but not limited to combining packets, splitting packets, and the like to perform the transformation.

Active network device 106 may maintain state information about the connection between client 102 and server 110, to gracefully close a connection if, for example, server 110 fails, or the like. In addition, active network device 106 may employ the state information to reroute a connection to another server should server 110 fail. State information associated with any security connection, compression/decompression action, and the like, may also be maintained by active network device 106.

Standby network device 108 is configured to operate substantially similar to active network device 106. Further, standby network device 108 is configured to mirror operations and determined connections of active network device 106 so as to assume the operations and determined connections in the event of a failure of active network device 106. As such, active network device 106 is configured to communicate determined information between standby network device 108, in case of a failover.

Although only a single standby network device 108 is illustrated, the present invention is not so limited. For example, active network device 106 may communicate with multiple standby network devices, without departing from the scope or spirit of the present invention.

As part of the mirroring of connections, active network device 106 and/or standby network device 108 may determine to mirror each connection. Active network device 106 and/or standby network device 108 may also be configured to determine a subset of connections to mirror. In one embodiment of the invention, active network device 106 and standby network device 108 may be configured to dynamically enable and/or disable mirroring based on virtually any aspect of a connection, including, but not limited to, a duration of a connection, a size of data being transferred, a type of data, a content of a packet, an identity of a user associated with client 102, an application, a characteristic associated with a customer, a characteristic associated with the packet, and the like. Moreover, dynamic mirroring may be enabled and/or disabled virtually anytime during a connection.

When standby network device 108 is brought 'on line,' it typically may have little or no knowledge of an active connection. Therefore, active network device 106 is further configured to provide a minimum amount of pre-determined information about each connection to standby network device 108 to enable it to recover the connection. This may be performed on as-needed bases, such that more active, or the busiest connections, may be mirrored before a lesser active connection. In one embodiment, a timer is employed to ensure that idle connections are mirrored within a reasonable, pre-determined, period of time.

For example, a list, table, database, and the like, of connections, maintained by active network device 106 may be walked through at a pre-determined rate. Connections identified within the list may be mirrored in a pre-determined order. However, when a packet is received by active network device 106, it may interrupt the walk-through, such that the connection associated with the packet may be mirrored. The walk-though may then be continued. The invention is not so limited however. For example, the connection associated with the received packet may also result in a reordering of the list, table, database, and the like, without departing from the scope of the invention.

Shown in FIG. 1, is one embodiment of connection mirroring of the connections managed by active network 106. A flow of packets associated with FIG. 1 is described in more detail below in conjunction with FIG. 5. Briefly, however, as shown in FIG. 1, the entire content of each packet in a connection to be mirrored is forwarded from active network device 106 to standby network device 108. Standby network device 108 is configured to perform substantially the same operations on the mirrored packet as active network device 106 might perform. However, standby network device 108 is configured typically not to send out its output, unless it becomes the active network device. During a complex operation, such as SSL, standby network device 108 is configured to receive and employ certain information from active network device 106. Such information may include a random seed, a server-random, encryption keys, certificates, and the like. Standby network device 108 may also receive and employ certain information from active network device 106 during other situations. This additional information may include an initial sequence number, and the like.

Communicating virtually the same packets to standby network device 108 enables standby network device 108 to construct virtually an equivalent internal state, substantially similar to one maintained by active network device 106. This enables a more rapid failover response should active network device 106 fail than might occur should standby network device 108 have to regenerate the actions from static information about the connections. This also enables complex, high-level protocols, such as compression, SSL, and the like, to be mirrored with minimal additional state information transferred from active network device 106. In some instances, such as with a compression action, virtually no transfer of state information may be needed.

Figure 2:
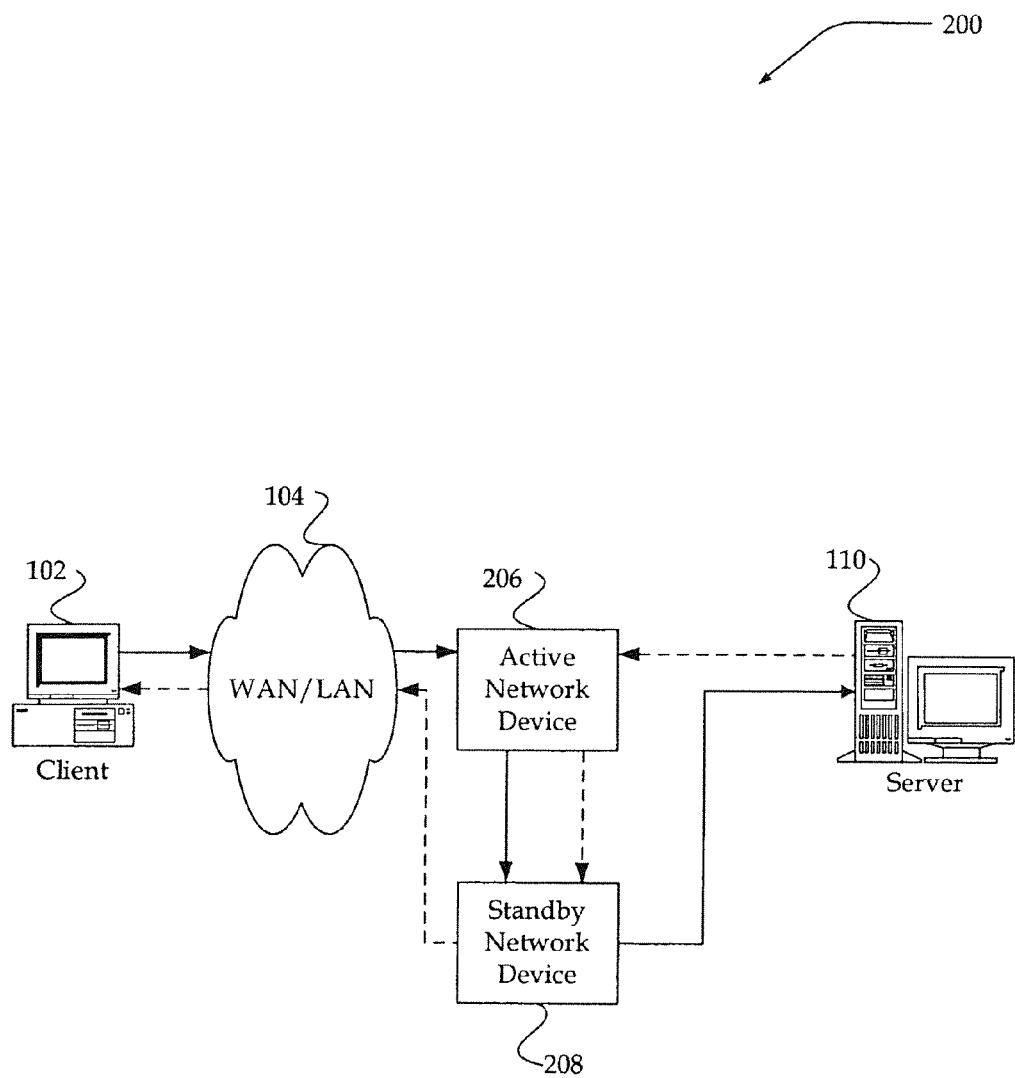
FIG. 2 illustrates one embodiment of an environment in which a system operates for managing reliability of a mirrored connection using a standby response configuration.

FIG. 2 illustrates one embodiment of an environment in which a system operates for managing reliability of a mirrored connection using a standby response configuration. Not all the components may be required to practice the invention, and variations in the arrangement and type of the components may be made without departing from the spirit or scope of the invention.

As shown in the figure, system 200 includes client 102, wide area network (WAN)/local area network (LAN) 104, active network device 206, standby network device 208, and server computer 110. Components numbered similar to those in FIG. 1 operate substantially similar. Active network device 206 is configured to perform similar to active network device 106 in FIG. 1. Similarly, standby network device 208 is configured to perform similar to standby network device 108 in FIG. 1. A difference between the environment shown in FIG. 1 and that shown in FIG. 2 is that the WAN/LAN 104 is in communication with client 102, active network device 206, and standby network device 208. Active network device 206 is also in communication with standby network device 208 and with server computer 110. Standby network device 208 is further in communication with server 110.

The flow of packets shown in FIG. 2 is described in more detail below in conjunction with FIG. 6. Briefly, however, as shown in FIG. 2, standby network device 208 is configured to send substantially all mirrored packets, including acknowledgement packets as appropriate, forwarded connection data, and the like, that might typically be sent by active network device 106 as shown in FIG. 1. Moreover, should a packet be dropped, corrupted, and the like, while being transferred between active network device 206 and standby network device 208, the appropriate network peer is configured to retransmit the packet, data, and the like, virtually the same as if it had been dropped at any other point in the network.

Figure 3:
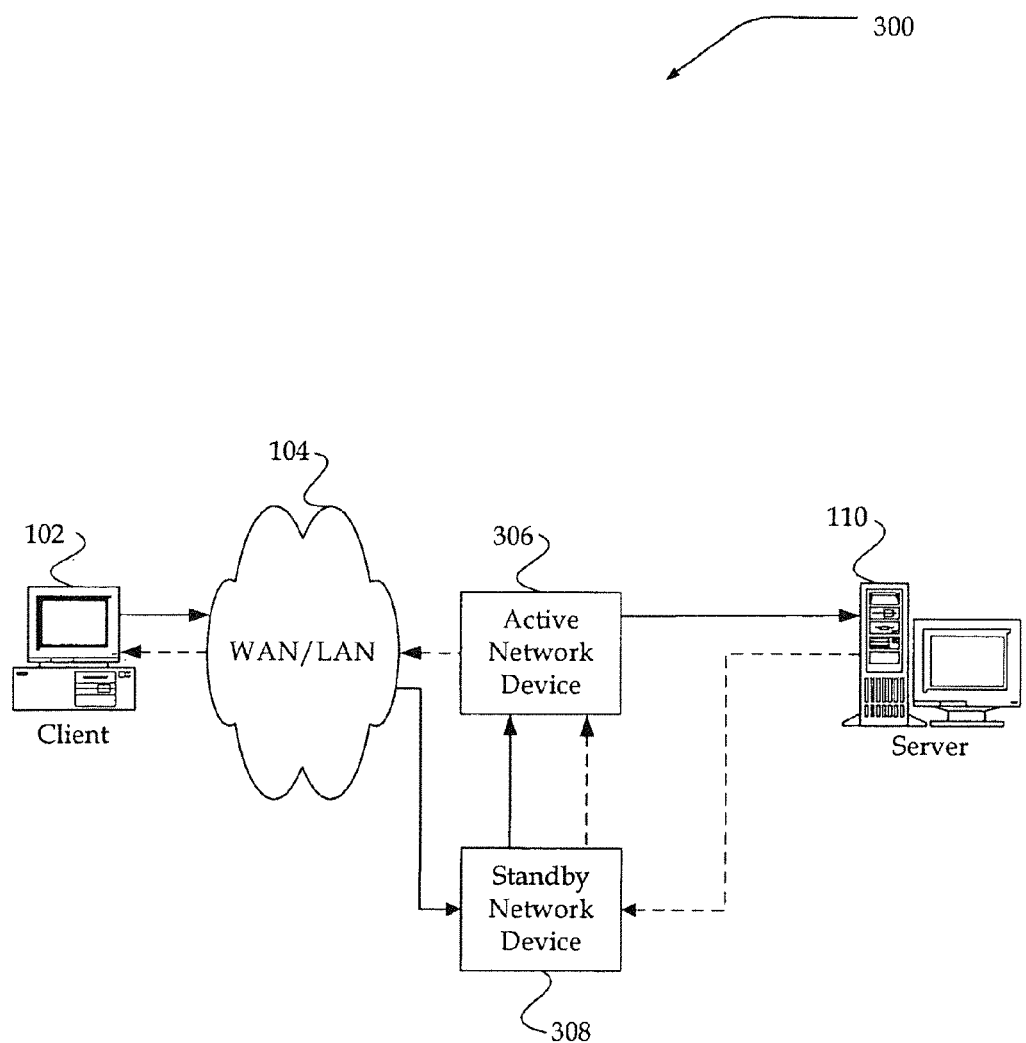
FIG. 3 illustrates one embodiment of an environment in which a system operates for managing reliability of a mirrored connection using a standby first configuration.

FIG. 3 illustrates one embodiment of an environment in which a system operates for managing reliability of a mirrored connection using a standby first configuration. Not all the components may be required to practice the invention, and variations in the arrangement and type of the components may be made without departing from the spirit or scope of the invention.

As shown in the figure, system 300 includes client 102, wide area network (WAN)/local area network (LAN) 104, active network device 306, standby network device 308, and server computer 110. Components numbered similar to those in FIG. 1 can operate in substantially similar ways. Active network device 306 is configured to perform similar to active network device 106 in FIG. 1. Similarly, standby network device 308 is configured to perform similar to standby network device 108 in FIG. 1. A difference between the environment shown in FIG. 1 and that shown in FIG. 3 is that the WAN/LAN 104 is in communication with client 102, active network device 306, and standby network device 308. Active network device 306 is also in communication with standby network device 308 and with server computer 110. Standby network device 308 is further in communication with server 110.

The flow of packets shown in FIG. 3 is described in more detail below in conjunction with FIG. 7. Briefly, however, as shown in FIG. 3, reliability of mirrored connections is ensured by arranging packets to be sent to standby network device 308 first. Standby network device 308 is configured to forward the packets to active network device 306. Active network device 306 forwards the packets as with non-mirrored connections.

Figure 4:
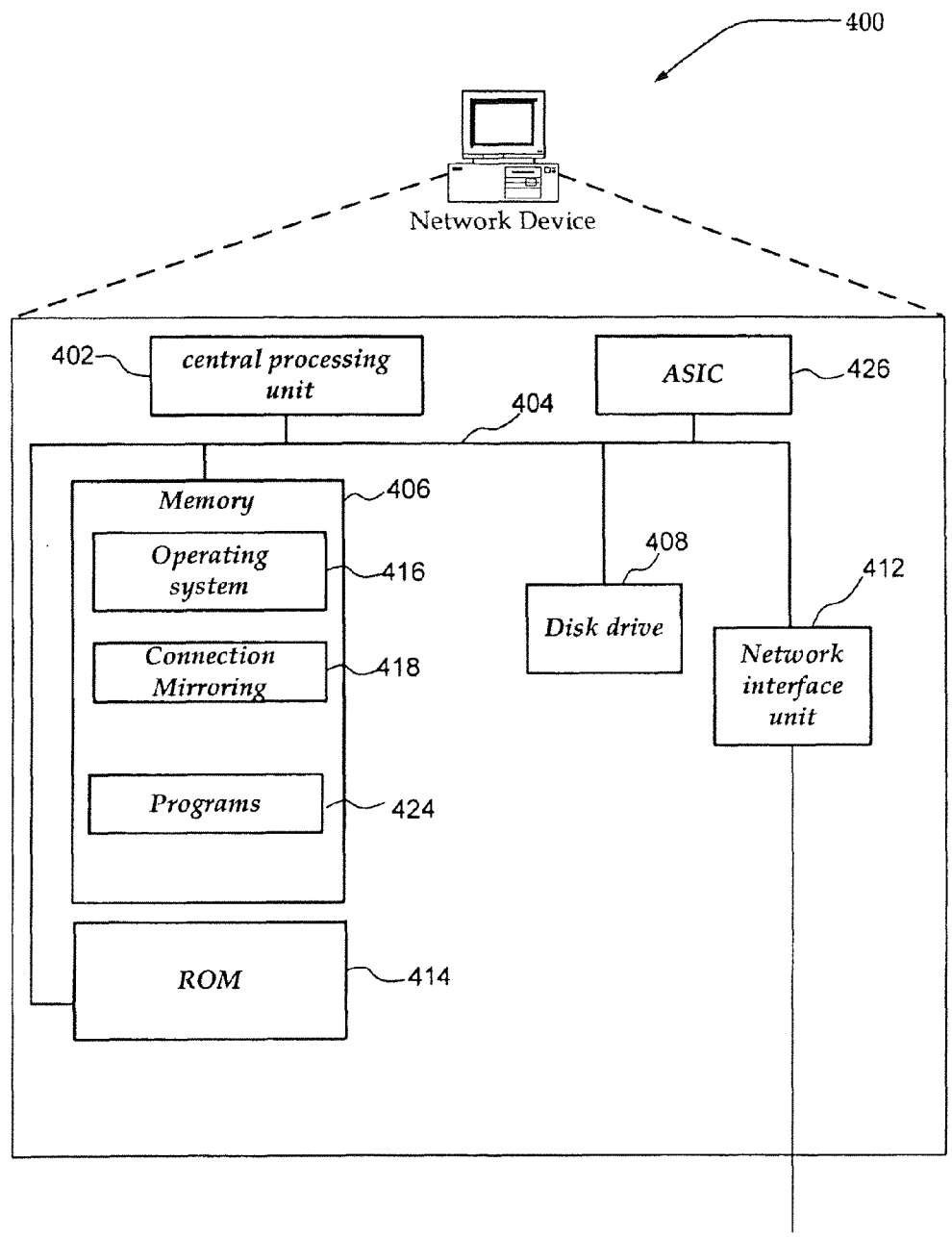
FIG. 4 illustrates a functional block diagram of one embodiment of a network device in which the invention may be practiced.

FIG. 4 illustrates a functional block diagram of one embodiment of a network device in which the invention may be practiced. It will be appreciated that not all components of network device 400 are illustrated, and that network device 400 may include more or fewer components than those shown in FIG. 4. Network device 400 may operate, for example, as a router, bridge, firewall, gateway, traffic management device, distributor, load balancer, server array controller, or proxy server. The communications may take place over a network, such as network 104 in FIGS. 1-3, the Internet, a WAN, LAN, or some other communications network known to those skilled in the art.

As illustrated in FIG. 4, network device 400 includes a central processing unit (CPU) 402, mass memory, and a network interface unit 412 connected via a bus 404. Network interface unit 412 includes the necessary circuitry for connecting network device 400 to network 104, and the like, and is constructed for use with various communication protocols including the TCP/IP and UDP/IP protocol. Network interface unit 412 may include or interface with circuitry and components for transmitting messages and data over a wired and/or wireless communications medium. Network interface unit 412 is sometimes referred to as a transceiver.

The mass memory generally includes random access memory ("RAM") 406, read-only memory ("ROM") 414, and one or more permanent mass storage devices, such as hard disk drive 408. The mass memory stores operating system 416 for controlling the operation of network device 400. The operating system 416 may comprise an operating system such as UNIX, LINUX™, Windows™, and the like.

In one embodiment, the mass memory stores program code and data for implementing a connection mirroring 418, and related program code and data, in accordance with the present invention. The mass memory may also store additional programs 424 and data for performing the functions of network device 400. Programs 424 may also include applications that are employed by connection mirroring 418 to handle complex, high-level protocols, including, but not limited to, compression and Secure Socket Layer (SSL) operations on packets.

In one embodiment, the network device 400 includes one or more Application Specific Integrated Circuit (ASIC) chips 426 connected to the bus 404. As shown in FIG. 4, the network interface unit 412 may connect to the bus through an ASIC chip. The ASIC chip 426 includes logic that performs some of the functions of network device 400. For example, in one embodiment, the ASIC chip 426 performs a number of packet processing functions, to process incoming packets. In one embodiment, determined actions of connection mirroring 418 are performed by the ASIC chip 426, a similar hardware device, and the like. In one embodiment, the network device 400 includes one or more field-programmable gate arrays (FPGA) (not shown), instead of, or in addition to, the ASIC chip 426. A number of functions of the network device can be performed by the ASIC chip 426, by an FPGA, by the CPU 402 with the logic of program code stored in mass memory, or by a combination of the ASIC chip and the CPU.

Computer storage media may include volatile and nonvolatile, removable and non-removable media implemented in any method or technology for storage of information, such as computer readable instructions, data structures, program modules or other data. Examples of computer storage media include RAM 406, ROM 414, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 400 may also include an input/output interface (not shown) for communicating with external devices or users.

Network device 400 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 400 can also be implemented as a combination of blades and additional components in the chassis.

Figure 5:
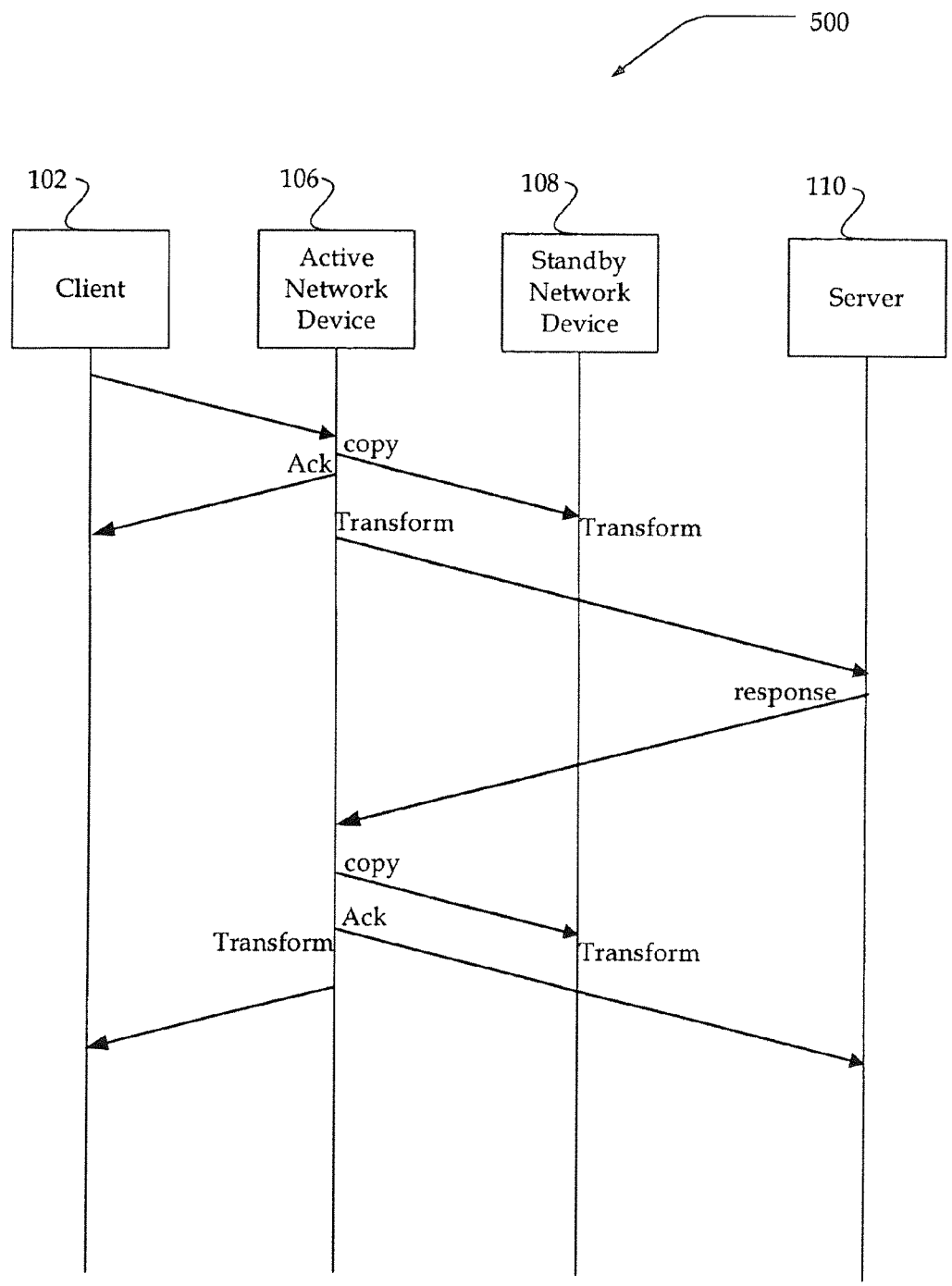
FIG. 5 illustrates one embodiment of a packet flow diagram for the system shown in FIG. 1.

FIG. 5 illustrates one embodiment of a packet flow diagram for the system shown in FIG. 1. As shown in the diagram, packet flow 500 includes client 102, active network device 106, standby network device 108, and server 110 across the top. Time may be viewed as flowing downward in the figure.

As shown in FIG. 5, client 102 sends a packet to active network device 106. Active network device 106 may make a determination based in part on a variety of attributes associated with the packet, whether the packet is to be mirrored. If the packet is to be mirrored, active network device 106 sends a copy of the packet to standby network device 108 for mirroring. Active network device may also provide an acknowledgement packet to client 102, indicating that the original packet was received. Active network device 106 and standby network device 108 both may perform transformations upon the packet, including compression/decompression, security actions, such as SSL actions, and the like. Should any unpredictable information, such as a server-random, encryption keys, certificates, and the like be needed by both devices, active network device 106 is configured to provide them to standby network device 108. Upon completion of the appropriate transformation operations, if any, the output of standby network device 108 may be discarded.

As next shown in the figure, active network device 106, forwards the packet, including any transformations upon the packet, to server 110. Server 110, provides a response to the packet to active network device 106. Active network device in return, provides a copy of the response packet to standby network device 108 for mirroring. Active network device 106 may also provide an acknowledgement packet to server 110.

Should any transformations be performed upon the response packet, both active network device and 106 and standby network device 108 perform them. In this manner, standby network device 108 is current and positioned to assume the active role should active network device 106 fail. However, if no failure of active network device 106 is detected, the output of standby network device 108 may be discarded. Active network device 106 sends the response packet, including any transformation upon the packet to client 102.

As shown in FIG. 5, the invention is configured to perform a traditional mirror before commit protocol. The client device sends a packet, the active network mirrors the packet to the standby network device before committing to move forward in the protocol by providing an acknowledgement packet. As such, should the active network device fail before sending the packet to the standby network device, no acknowledgement packet is sent. The client would traditionally retransmit the packet. If the active network device fails after sending the packet copy to the standby network device, the standby network device, would then be ready to take over as the active network device.

However, the above configuration may sometimes result in dropped packets between the standby network device and the active network device. The active network device may fail to the standby network device. The standby network device may however continue as though there wasn't a problem, resulting in the standby network device and active network device possibly being out of synchronization. The configurations described below in FIGS. 6 and 7 (and above in FIGS. 2 and 3) are directed at overcoming such problems.

Figure 6:
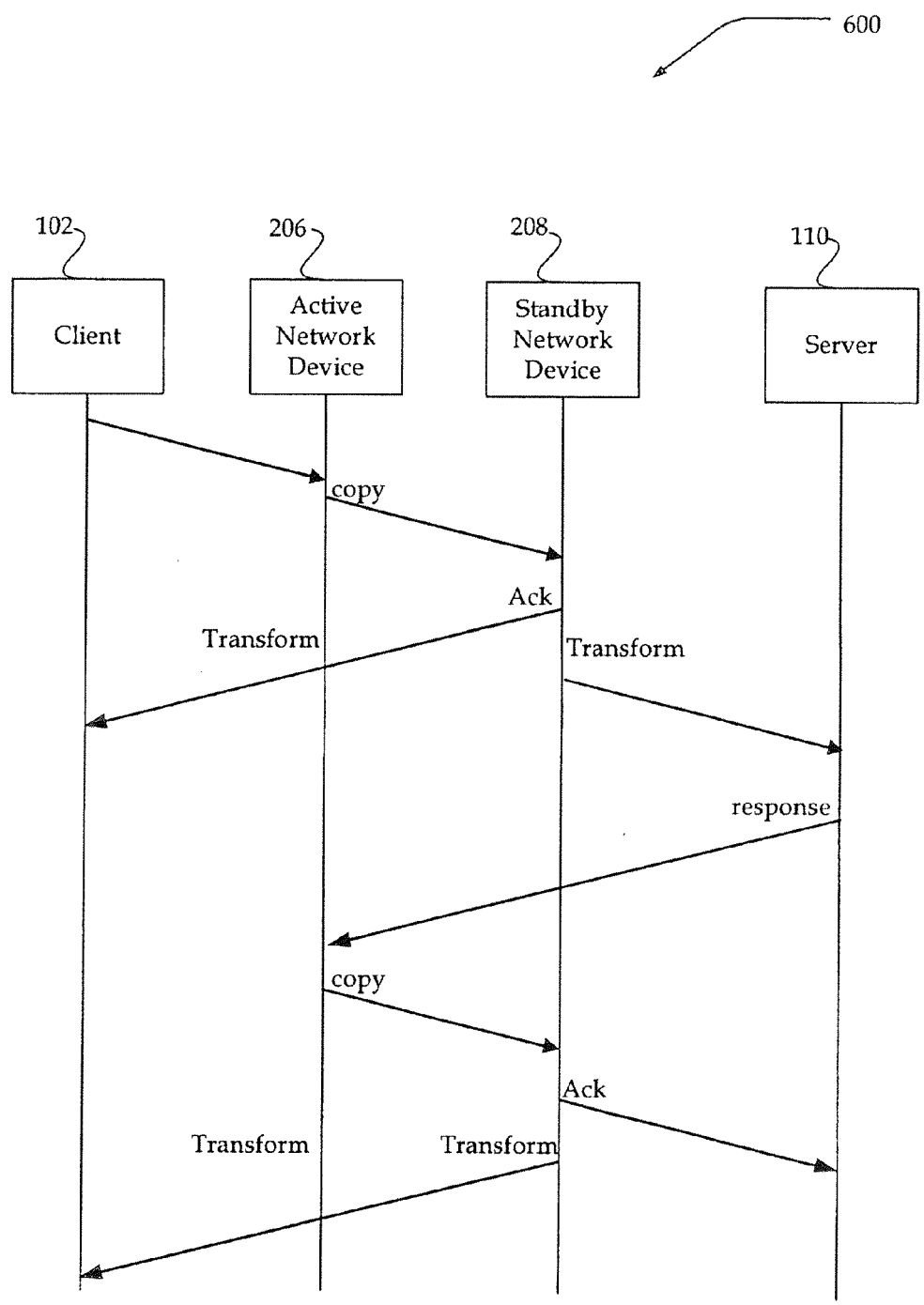
FIG. 6 illustrates one embodiment of a packet flow diagram for the system shown in FIG. 2.

FIG. 6 illustrates one embodiment of a packet flow diagram for the system shown in FIG. 2. As shown in FIG. 6, packet flow 600 includes client 102, active network device 206, standby network device 208, and server 110 across the top. Time may be viewed as flowing downward in the figure.

As shown in the figure, the standby network device sends substantially all packets that might normally be sent by the active network device, including acknowledgement packets and forwarded connection information. Also, in this configuration, the results of transformations, and other output, from active network device 206 are discarded, other than any unpredictable information, such as a server-random, encryption keys, certificates, and the like needed by both devices. Thus, for example, the acknowledgement packet is sent by standby network device 208 upon receipt of the copy of the client's packet, and the copy of the response packet. Additionally, standby network device 208 provides the transformed client's packet to server 110, and the transformed response packet to client 102.

Figure 7:
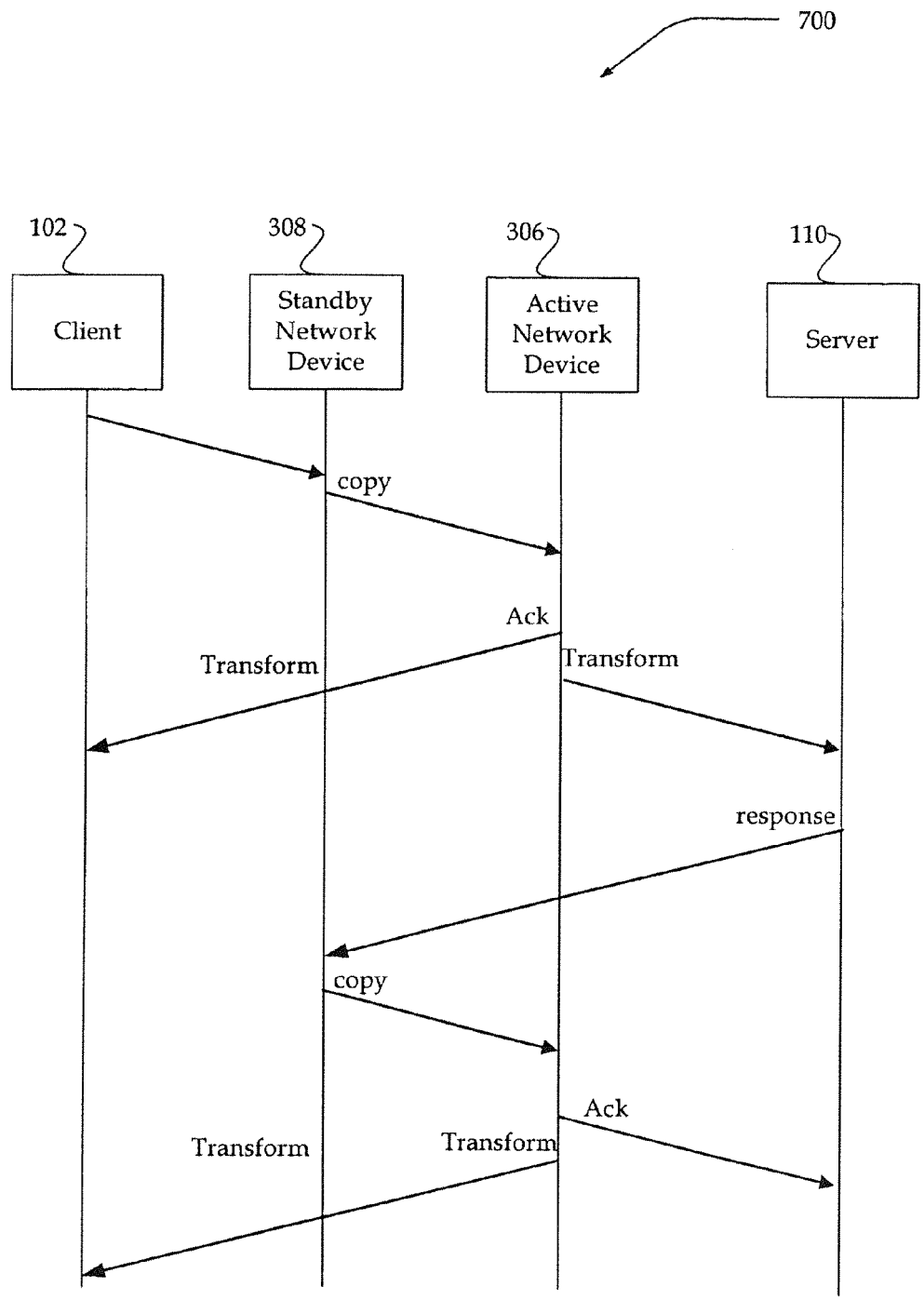
FIG. 7 illustrates one embodiment of a packet flow diagram for the system shown in FIG. 3.

FIG. 7 illustrates one embodiment of a packet flow diagram for the system shown in FIG. 3. As shown in FIG. 7, packet flow 700 includes client 102, active network device 306, standby network device 308, and server 110 across the top. Time may be viewed as flowing downward in the figure.

As shown in the figure, network traffic is arranged to be sent to standby network device 308 first. Standby network device 308 is configured to forward packets to active network device 306. As such, for example, standby network device 308 receives the packet from client 102, and forwards a copy of the packet to active network device 306. Similarly, standby network device 308 receives the response packet from server 110, and forwards a copy of the response packet to active network device 306. Active network device 306 is configured to forward network traffic as with non-mirrored connections. For example, active network device 306 forwards the acknowledgement to client 102, and forwards the client's packet, including any transformation upon the packet to server 110. Similarly, active network device 306, forwards the response packet to client 102, including any transformation upon the response packet.

The standby first and standby response mechanisms described above in conjunction with FIGS. 6 and 7 may be implemented to avoid sending a packet by packet acknowledgement from the standby network device to the active network device. However, the present invention is not so limited. For example, either mechanism may be implemented to send a packet by packet acknowledgement between the active network device and standby network device, without departing from the scope of the present invention.

Illustrative Method of Ensuring Reliability of a Mirrored Connection

Figure 8:
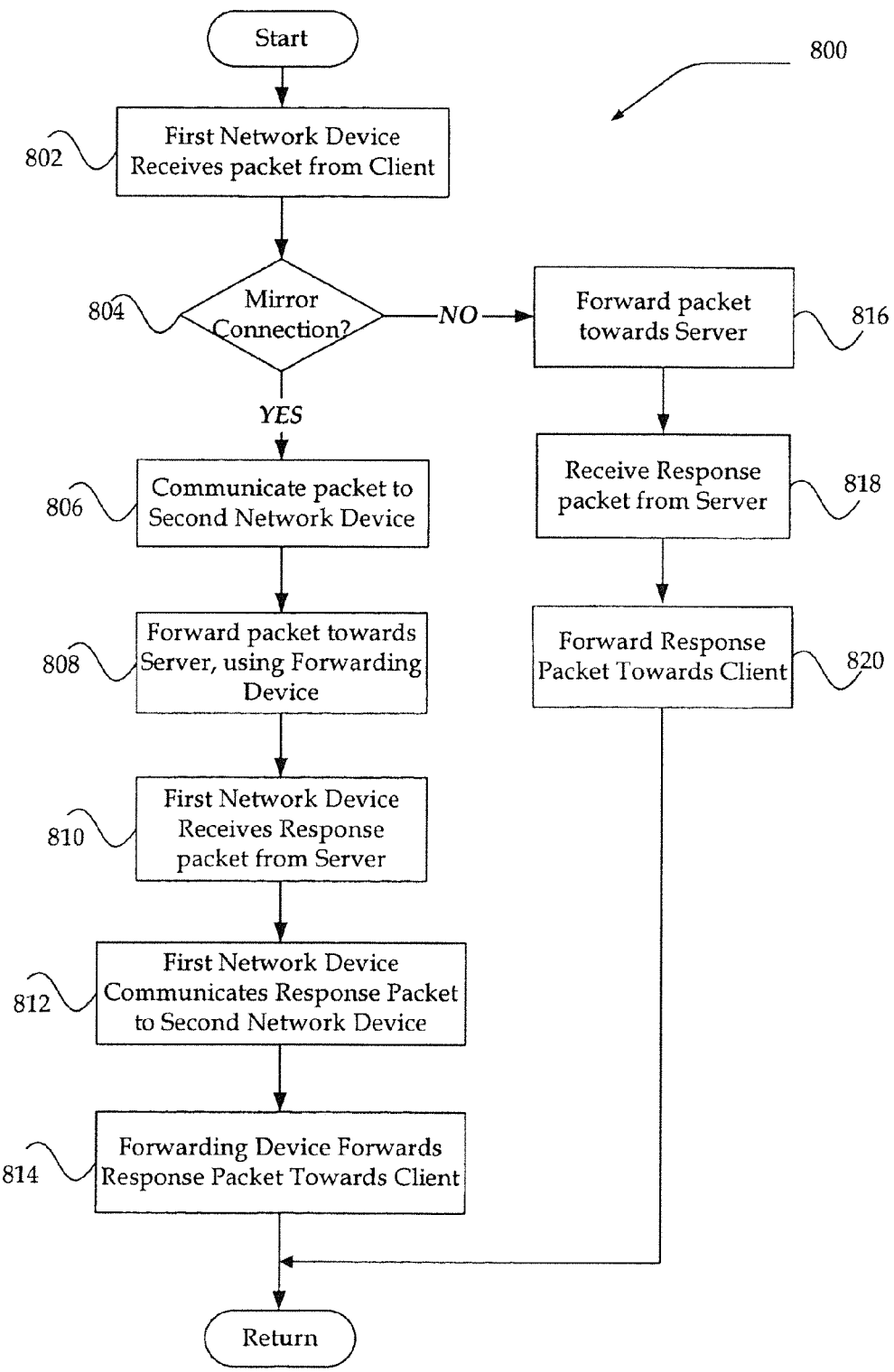
FIG. 8 illustrates is a flow diagram generally showing one embodiment of a process of managing the reliability of a mirrored connection as shown in FIGS. 1-3, according to one embodiment of the invention.

FIG. 8 illustrates is a flow diagram generally showing one embodiment of a process of managing the reliability of a mirrored connection as shown in FIGS. 1-3, and 5-7, according to one embodiment of the invention.

Process 800 typically starts after a first network device, a second network device, and a forwarding network device is determined. However, the invention is not so limited. For example, the forwarding network device may be determined dynamically, during operation of process 800.

As shown in FIG. 8, process 800 may thus be deployed in FIG. 1, where the first network device is active network device 106, the second network device is standby network device 108, and the forwarding device is active network device 108. Process 800 may also be deployed across components in FIG. 2, where the first network device is active network device 206, the second network device is standby network device 208, and the forwarding device is standby network device 208. Additionally, process 800 may be deployed across components in FIG. 3, where the first network device is standby network device 308, the second network device is active network device 306, and the forwarding device is active network device 306. However, the invention as illustrated in FIG. 8 is not so limited. For example, process 800 may also be deployed in a system where the first network device is a standby network device, the second network device is an active network device, and the forwarding device is the standby network device, without departing from the scope of the present invention.

Process 800 proceeds after a start block, at block 802, where the first network device receives a packet from a client device. For example, as in FIGS. 2 and 6, the first network device is the active network device. As shown in FIGS. 3 and 7, the first network device is the standby network device.

Process 800 continues to decision block 804, where a determination is made whether a connection associated with the received packet is to be mirrored. Mirroring of a connection may be based upon a variety of aspects of a connection, including, but not limited to, duration of a connection, a characteristic of the received packet, an application being accessed by the client, and the like. In any event, if it is determined that the connection is to be mirrored, processing proceeds to block 806; otherwise, processing branches to block 816.

At block 806, a copy of the packet is communicated to the second network device. Also, at block 806, the pre-determined forwarding device sends an, acknowledgement packet to the client device. As shown in FIGS. 5 and 7, the active network device may provide an acknowledgement packet to the client device. As shown in FIG. 6, the standby network device may provide the acknowledgement packet to the client device.

Process 800 proceeds to block 808, where the pre-determined forwarding device forwards the packet towards the server. As shown in FIGS. 5 and 7, the active network device forwards the packet. The process continues to block 810, where the first network device receives a response packet from the server. The process proceeds to block 812, where the first network device communicates a copy of the response packet to the second network device. Furthermore, an acknowledgement packet is also sent to the server by the pre-determined forwarding device, to acknowledge receiving the response packet.

The process next continues to block 814, where the forwarding device forwards the response packet towards the client. Upon completion of block 814, processing returns to a calling process.

Back at decision block 804, if it is determined that the connection is not to be mirrored, processing branches to block 816, where the first network device forwards the packet received from the client device towards the server. At block 816, the first network device may also provide an acknowledgement packet to the client device. At block 818, the first network device receives a response packet from the server, and at block 820 forwards the response packet towards the client. Also at block 820, the first network device may provide an acknowledgement packet to the server. Upon completion of block 820, processing returns to the calling process.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Although the invention is described in terms of a packet communicated between a client device and a server, the invention is not so limited. For example, the packet may be communicated between virtually any resource, including but not limited to multiple clients, multiple servers, and any other device, without departing from the scope of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A system, comprising:
    a first network device having one or more processors that perform actions, including:
        receiving a packet from a client device, when it is determined that the first network device is designated to receive the packet from the client device, and a second network device is not so designated;
        sending an acknowledgement (ACK) message to the client device, when it is determined that the first network device is designated to provide the ACK message to the client device, and the second network device is not so designated;
    the second network device having one or more processing devices that perform actions, including:
        sending the ACK message to the client device, when it is determined that the second network device is designated to provide the ACK message to the client device, and the first network device is not so designated,
    wherein the network device not designated to receive the packet from the client device, instead receives the packet from the network device designated to receive the packet from the client device such that a connection state is separately constructed by both the first and the second network devices based on the received packet to enable connection mirroring; and
    wherein the first network device further performs actions, including:
        forwarding the packet to a server device, when it is determined that the first network device is designated to forward the packet, and the second network device is not so designated, otherwise the second network device forwards the packet to the server device;
        receiving a response from the server device, when it is determined that the first network device is designated to receive the response from the server device, and the second network device is not so designated;
        when the first network device is designated to receive the response, sending the response to the second network device; otherwise, receiving the response from the second network device; and
        sending an other ACK message to the server device, when the first network device is designated to provide the other ACK message, otherwise, the second network device provides the ACK message to the response from the server device.

2. The system of claim 1, wherein the first network device performs actions, further including:
    forwarding to the client device the response from the server device, when it is determined that the first network device is designated to forward the response, and the second network device is not so designated, otherwise, the second network device forwards the response to the client device; and
    when the first network device is designated and the second network device is not so designated, forwarding to the second network device the response, otherwise receiving the response from the second network such that both network devices separately maintain connection state for connection mirroring using the response.

3. The system of claim 1, wherein at least one of the first network device or the second network device performs a transformation on the packet from the client device, including one of a compression, decompression, or security action.

4. The system of claim 1, wherein the first network device or the second network device is configured to provide the other of the second network device or the first network device, at least one of a server-random value, an encryption key, or a certificate associated with maintaining connection state.

5. The system of claim 1, wherein one of the first network device or the second network device is designated as a standby network device usable during failover of the other of the second network device or the first network device.

6. The system of claim 1, wherein the first network device is configured to operate as at least one of a proxy device or a load-balancing device.

7. A computer-based method operating on several processors, to perform actions, including:
    receiving a packet from a client device by a first network device, when it is determined that the first network device is designated to receive the packet from the client device, and a second network device is not so designated;
    sending, by the first network device, an acknowledgement (ACK) message to the client device, when it is determined that the first network device is designated to provide the ACK message to the client device, and the second network device is not so designated;
    sending the ACK message to the client device by the second network device, when it is determined that the second network device is designated to provide the ACK message to the client device, and the first network device is not so designated;
    the network device not designated to receive the packet from the client device, instead receives the packet from the network device designated to receive the packet from the client device such that a connection state is separately constructed by both the first and the second network devices using the received packet to enable connection mirroring; and
    forwarding the packet to a server device by the first network device, when it is determined that the first network device is designated to forward the packet, and the second network device is not so designated, otherwise the second network device forwards the packet to the server device;
    receiving a response from the server device by the first network device, when it is determined that the first network device is designated to receive the response from the server device, and the second network device is not so designated;
    when the first network device is designated to receive the response, forwarding the response to the second network device; otherwise, receiving by the first network device the response from the second network device; and
    sending an other ACK message to the server device by the first network device, when the first network device is designated to provide the other ACK message, otherwise, the second network device provides the other ACK message to the response from the server device.

8. The computer-based method of claim 7, further comprising:
    forwarding to the client device the response from the server device by the first network device, when it is determined that the first network device is designated to forward the packet, and the second network device is not so designated, otherwise, the second network device forwards the response to the client device; and when the first network device is designated and the second network device is not so designated, forwarding to the second network device the response by the first network device; otherwise receiving the response from the second network by the first network device such that both network devices separately maintain connection state for connection mirroring.

9. The computer-based method of claim 7, wherein at least one of the first network device or the second network device performs a transformation on the packet from the client device, including one of a compression, decompression, or a security action.

10. The computer-based method of claim 7, wherein the first network device or the second network device provides the other of the second network device or the first network device at least one of a server-random value, an encryption key, or a certificate associated with maintaining connection state.

11. The computer-based method of claim 7, wherein one of the first network device or the second network device is designated as a standby network device usable during failover of the other of the second network device or the first network device.

12. The computer-based method of claim 7, wherein the first network device and the second network device operate within a blade architecture or Application Specific Integrated Circuit chips.

13. An apparatus comprising a non-transitory computer readable device, having computer-executable instructions stored thereon, that in response to execution by one or more network devices, cause the network devices to perform operations, comprising:

receiving a packet from a client device by a first network device, when it is determined that the first network device is designated to receive the packet from the client device, and a second network device is not so designated;

sending, by the first network device, an acknowledgement (ACK) message to the client device, when it is determined that the first network device is designated to provide the ACK message to the client device, and the second network device is not so designated;

sending the ACK message to the client device by the second network device, when it is determined that the second network device is designated to provide the ACK message to the client device, and the first network device is not so designated;

the network device not designated to receive the packet from the client device, instead receives the packet from the network device designated to receive the packet from the client device such that a connection state is separately constructed by both the first and the second network devices based on the received packet to enable connection mirroring; and forwarding the packet to a server device by the first network device, when it is determined that the first network device is designated to forward the packet, and the second network device is not so designated, otherwise the second network device forwards the packet to the server device;

receiving a response from the server device by the first network device, when it is determined that the first network device is designated to receive the response from the server device, and the second network device is not so designated;

when the first network device is designated to receive the response, forwarding the response to the second network device; otherwise, receiving the response from the second network device; and sending an other ACK message to the server device by the first network device, when the first network device is designated to provide the other ACK message, otherwise, the second network device provides the other ACK message to the response from the server device.

14. The apparatus of claim 13, wherein the operations, further comprising:

forwarding to the client device the response from the server device by the first network device, when it is determined that the first network device is designated to forward the packet, and the second network device is not so designated, otherwise, the second network device forwards the response to the client device; and when the first network device is designated and the second network device is not so designated, forwarding to the second network device the response; otherwise receiving the response from the second network by the first network device such that both network devices separately maintain connection state for connection mirroring.

15. The apparatus of claim 13, wherein at least one of the first network device or the second network device performs a transformation on the packet from the client device, including one of a compression, decompression, or a security action.

16. The apparatus of claim 13, wherein one of the first network device or the second network device is designated as a standby network device usable during failover of the other of the second network device or the first network device.

17. The apparatus of claim 13, wherein the first network device and the second network device operate within a blade architecture or Application Specific Integrated Circuit chips.

* * * * *